Dec. 6, 1966 J. H. FARRELL ETAL 3,289,303
INSERTION DEVICE
Filed Dec. 18, 1964

INVENTORS
JAMES H. FARRELL
GEORGE HENRY
BY
Kenway, Jenney + Hildreth
ATTORNEYS

United States Patent Office 3,289,303
Patented Dec. 6, 1966

3,289,303
INSERTION DEVICE
James H. Farrell, Arlington, and George Henry, Norwell, Mass., assignors to Flow Corporation, Cambridge, Mass., a corporation of Massachusetts
Filed Dec. 18, 1964, Ser. No. 419,353
4 Claims. (Cl. 33—126)

Our invention relates to instruments designed to be mounted in enclosures, such as fuel tanks, for monitoring various conditions. In particular it relates to a device for inserting an instrument through a narrow inlet passage and thereafter positioning the instrument at a predetermined location.

The insertion device of the invention has proved very useful in association with a system for determining when the level of fuel oil in a tank has reached a given level. In that system a heated thermistor is suspended at the desired level in the tank and electrically connected to an indicating device outside the tank. As fuel is introduced into the tank the level rises until the thermistor becomes immersed in fuel oil; then there is a change in the rate at which heat is conducted from the thermistor, its resistance thereupon changes, and the indicator responds accordingly.

While some tanks are so located that no problem is involved in mounting the thermistor, many others are buried in the ground and accessible only through fill pipes and vents. A vent customarily comprises a pipe leading from the top of the tank to the outside, through a series of vertical and horizontal reaches connected by elbow joints.

The primary object of the invention is to facilitate the insertion of an instrument through a narrow tortuous passage and into a tank or other enclosure.

Another object of the invention is to make it possible to insert a probe into a tank through a tortuous passage of unknown length and also to position the probe at a predetermined level in the tank.

An important feature of the invention resides in a capsule adapted to contain an instrument, a predetermined length of wire connected to the instrument, and a spring-operated device for automatically opening the capsule when a catch is tripped. The capsule is secured to the end of a hollow flexible snake housing the wire or wires leading to the instrument as well as a trip wire for releasing the catch.

Figure 1:
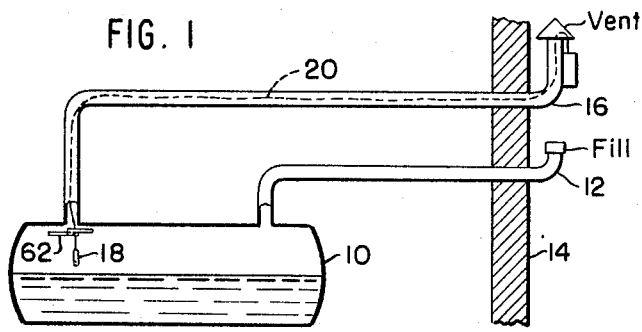
Figure 2:
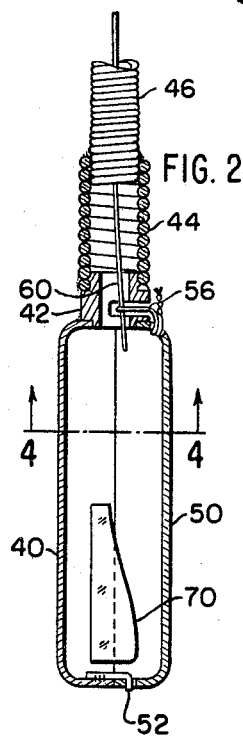
Figure 3:
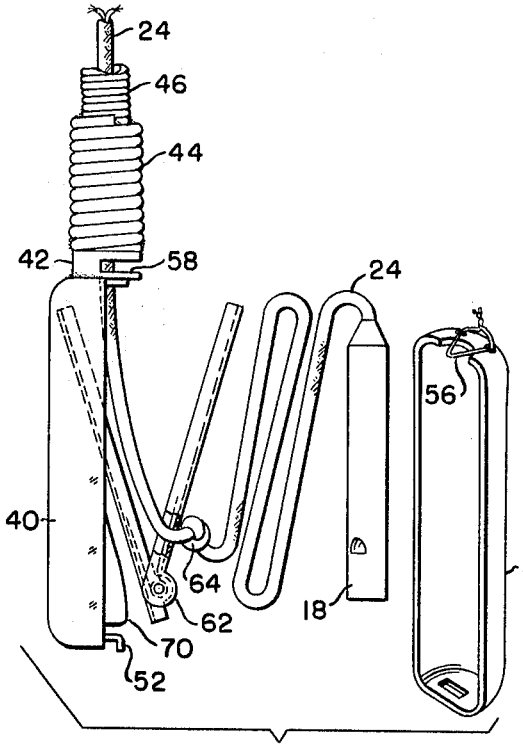
Figure 4:
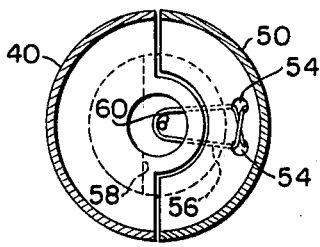
Figure 5:
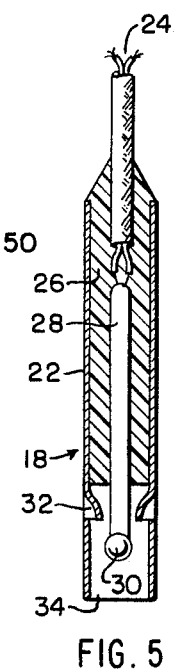

These and other objects and features of the invention will be more readily understood and appreciated from the following detailed description of a preferred embodiment thereof selected for purposes of illustration and shown in the accompanying drawing, in which:

FIG. 1 is a diagrammatic view showing a typical tank and associated pipes including a vent pipe, and illustrating the disposition of a thermistor probe inserted into the tank through vent pipe, FIG. 2 is a view in cross-section through a capsule constructed in accordance with the invention, FIG. 3 is a view in side elevation of the capsule after it has been actuated to eject the probe, FIG. 4 is a view in cross-section along the line 4—4 of FIG. 2, and FIG. 5 is a view in cross-section through the thermistor probe.

The general array of a typical tank is shown in FIG. 1, wherein it will be seen that a horizontally disposed fuel tank 10 is provided with a fill pipe 12 leading to the exterior of a building through the wall 14. The tank 10 is also connected through its top wall to a vent pipe 16 comprising a pair of vertical pipes connected by a horizontal pipe. A thermistor probe 18 is suspended in the tank 10 at the end of a cable 20 passing through the vent pipe.

The details of the probe, as shown in FIG. 5, include a cylindrical metal casing 22 within which a thermistor 28 is held in a matrix 26 of a plastic potting composition and connected to a pair of wires 24 protected by conventional insulation. The thermistor 28 projects beyond the plastic matrix 26 and carries at its end a ceramic bead 30 connected in series with the thermistor and arranged to be heated by current from an external source. The free end of the casing 22 has an open mouth 34 as well as a plurality of inwardly punched louvers 32 forming vent holes providing for the escape of air when the liquid level closes off the mouth 34.

As shown in FIGS. 2 and 3, the insertion device of our invention is organized about an elongated, metal shell or capsule 40 welded at one end to an annulus or bushing 42 welded in turn to one end of a coil spring 44. The other end of the spring 44 is welded to the end of a hollow, flexible metal "snake," or coil, 46 by means of which the capsule may be passed through the vent pipe 16. The diameter of the snake and the dimensions of the capsule are appropriately selected with respect to the diameter of the vent pipe 16. Moreover, the edges of the capsule 40 are rounded to facilitate its passage through the vent pipe.

The capsule 40 is provided with a matching cover 50 having a hole at the far end, which engages a pin 52 fixed to the end of the capsule 40. The rear end of the cover 50 is provided with a pair of spaced holes 54 to receive a wire bail 56. The bushing 42 is provided with a transverse slot 58 extending inwardly to at least the bottom of its bore, as shown in FIG. 4.

A slender trip wire 60 is passed through the snake and through the bushing 42. The wire which is to form the bail 56 is first passed into the slot 58 and under the trip wire 60, back out of the slot 58, and through the holes 54 in the rear end of the cover 50. The ends are then twisted, as shown in FIG. 3 to secure the cover in place upon the body of the capsule 40. Thus the bail 56 serves as a catch which holds the cover in place on the capsule 40 until the trip wire 60 is retracted through the snake to disengage the bail.

The wires 24 leading to the probe 18 are passed through one leg of a two-legged, spring-actuated fly 62, and a knot 64 is tied in the wires 24 at a predetermined distance above the probe 18. The wires 24 are then pleated back and forth and collapsed against the probe 18 and the fly 62, and the whole assembly crowded into the body of the capsule 40, being held there by hand while the cover 50 is first engaged upon the pin 52 and then brought down into closed position upon the capsule 40. When this has been accomplished, the cover and capsule should be temporarily taped together while the wire 56 is passed under the trip wire and through the holes 54 to form the bail.

When the device is to be used, the tape is removed, the capsule and snake are inserted in the exterior opening of the vent 16 and passed through the vent pipe into the interior of the tank 10. Thereupon the trip wire 60 is retracted until the bail 56 is disengaged; then the spring-actuated fly will operate to eject the cover 50 and the probe 18 which then dangles on the wires 24. The fly 62 will have assumed a rectilinear configuration, as shown in FIG. 1. Consequently the snake with the capsule 40 may then be withdrawn through the vent pipe, but the expanded fly 62 will engage the wall of the tank and prevent withdrawal of the wires 24 and the probe 18. The probe is automatically positioned at a level below the top of the tank equal to the distance between the knot 64 (which engages the fly) and the probe 18. Thus the desired level may be predetermined by selecting the position for the knot 64. Hence, the fly performs three functions: it ejects the cover and the probe from the body of the capsule 40, it permits removal of the snake without removal of the probe, and it presets the level at which the probe hangs in the tank.

To assist in the removal of the capsule 40, there is provided a pair of ears 70 secured to the inner walls of the capsule adjacent the forward end thereof in order to provide a smooth riding surface and prevent snagging of the pin 52 upon elbow connections or other obstacles in the vent pipe 16.

The wires 24 are connected to an external circuit for providing current to the thermistor and ceramic bead 30 as well as providing voltage or current measuring means which form no part of the invention.

When the bead 30 is heated, heat will be conducted away from it at one rate while it is suspended in air, but when the bead 30 is immersed in a liquid such as fuel oil, the rate at which the heat is conducted away will vary sharply, the thermistor will therefore change resistance, and the external circuit will so indicate. The holes formed by punching in the louvers 32 vent the open end of the cylindrical casing 22, while the louvers themselves tend to prevent liquid from splashing onto the bead 30 and perhaps giving a false reading.

Those skilled in the art will immediately perceive equivalent structures which may be utilized to accomplish the invention, the scope of which is measured by the appended claims.

We claim:
1. An insertion device comprising a hollow flexible cable, a capsule secured to one end of the cable, a cover releasably secured to the capsule, a spring normally urging the cover and capsule to separate, a catch disposed to clamp the cover in place on the capsule, and a trip wire associated with said catch and passing through said cable to the other end thereof, whereby actuation of the trip wire trips the catch to cause the spring to separate the cover from the capsule.

2. An insertion device comprising a hollow snake, a capsule secured to one end of said snake, a thermistor probe disposed in said capsule and adapted to be ejected therefrom, a cover releasably secured to said capsule, means for releasing the cover from a position remote therefrom, and means in the capsule for ejecting the probe upon release of said cover.

3. An insertion device comprising a hollow snake, a capsule secured to one end of said snake, a thermistor probe disposed in said capsule, wires connected to said probe and running through said snake, predetermined portions of said wires being gathered and disposed in said capsule along with said probe, a cover releasably secured to said capsule, and means for releasing said cover and ejecting the probe from the capsule, said predetermined portions of the wires being adapted, when straight, to position the probe a distance from the capsule determined by the length of the wires constituting said portions.

4. An instrument for signalling liquid level in a tank, comprising a casing, a thermistor disposed in said casing and being adapted to signal a change in the liquid level by a change in its electrical resistance, wires connected to said thermistor, a capsule, a cover releasably secured to said capsule, said thermistor and casing and predetermined lengths of said wires being disposed in said capsule, a two-legged fly disposed in said capsule in position normally to urge separation of the capsule and cover, a catch disposed to hold the cover in place on the capsule, a hollow flexible cable secured at one end to said capsule, a trip wire secured to said catch and running through said cable, said wires also running through said cable, said fly being connected to at least one of said wires, whereby actuation of the trip wire trips the catch to separate the cover from the capsule in response to the action of the fly, whereupon the thermistor in its casing is suspended below the capsule by a distance equal to the lengths of said wires between the capsule and the thermistor.

References Cited by the Examiner
UNITED STATES PATENTS

| | | | |
|---|---|---|---|
| 2,276,864 | 3/1942 | Pearson | 338—23 |
| 2,539,604 | 1/1951 | Woolley | 33—126.5 |
| 2,774,854 | 12/1956 | Stack | 338—23 |
| 3,129,513 | 4/1964 | Porter | 33—126.4 |

LEONARD FORMAN, Primary Examiner.

W. QUARLES, H. N. HAROIAN, Assistant Examiners.